(12) United States Patent
Canestaro et al.

(10) Patent No.: US 6,446,238 B1
(45) Date of Patent: Sep. 3, 2002

(54) SYSTEM AND METHOD FOR UPDATING MICROCODE STORED IN A NON-VOLATILE MEMORY

(75) Inventors: Christopher L. Canestaro; John Steven Langford; Rick Allen Hamilton, II, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,756

(22) Filed: May 21, 1999

(51) Int. Cl.$^7$ .................................................. G06F 11/10

(52) U.S. Cl. ........................ 714/807; 714/800; 714/804

(58) Field of Search ................................. 714/755, 757, 714/719, 748, 807, 800, 804; 710/62; 709/236, 246

(56) References Cited

U.S. PATENT DOCUMENTS

| | | | | |
|---|---|---|---|---|
| 5,404,361 A | | 4/1995 | Casorso et al. ............. | 371/40.1 |
| 5,412,666 A | * | 5/1995 | Squires et al. ............... | 714/755 |
| 5,581,724 A | | 12/1996 | Belsan et al. ................ | 395/441 |
| 5,659,801 A | * | 8/1997 | Kosaftis ....................... | 710/62 |
| 5,778,031 A | | 7/1998 | Jedwab ......................... | 371/53 |
| 5,826,032 A | * | 10/1998 | Finn et al. ................... | 709/236 |
| 5,878,050 A | * | 3/1999 | Brahme et al. ............. | 714/719 |
| 5,878,057 A | * | 3/1999 | Maa ............................ | 714/757 |
| 6,141,784 A | * | 10/2000 | Davis et al. ................. | 714/748 |
| 6,145,012 A | * | 11/2000 | Small .......................... | 709/246 |

FOREIGN PATENT DOCUMENTS

| | | |
|---|---|---|
| JP | 07038854 A | of 0000 |
| JP | 08293801 A | of 0000 |
| WO | WO98/38764 | of 0000 |

OTHER PUBLICATIONS

Jim Chou & Kannan Ramchandran; Arithmetic Coding Based Continuous Error Detection for Efficient ARQ–based Image Transmission; The Thirty–First Asilomar Conference on Signals, Systems & Computers.

Igor Kozintsev, Jim Chou & Kannan Ramchandran; Image Transmission Using Arithmetic Coding Based Continuous Error Detection; DCC'98 Data Compression Conference.

Vinay Chande & Nariman Farvardin; A Joint Source–Channel Coding Scheme for Robust Image Transmission; R. Chandramouli, N. Ranganathan & Shivaraman J. Ramados; Empirical Channel Matched Quantizer Design and UEP for Robust Image Transmission; DCC'98 Data Compression Conference.

IBM Technical Disclosure Bulletin; vol. 40 No. 08 Aug. 1997; Complete–Image Update Methodology for Single Device, Read Only Memory–Executed Microcode.

IBM Technical Disclosure Bulletin; vol. 39 No. 07 Aug. 1996; Encoded Security Feature for Digital Images.

(List continued on next page.)

*Primary Examiner*—David Ton
(74) *Attorney, Agent, or Firm*—Joseph P. Lally; Mark E. McBurney

(57) ABSTRACT

A method of verifying the integrity of a file transferred as a plurality of sectors. During a first pass transfer of a sectored file, first pass sector CRC codes are generated for each sector and stored in system memory. During a second pass transfer, second pass CRC codes are generated for each sector. The second pass CRC codes are compared to the first pass CRC codes for corresponding sectors. If the second pass CRC code matches the first pass CRC code, the sector is committed to the destination medium. The CRC sector values for an initial sector of the file are preferably generated from a predefined seed. Each successive CRC sector value is then preferably generated from the preceding sector's CRC code such that the sector CRC code of the last sector comprises a final CRC code of the file.

19 Claims, 3 Drawing Sheets

OTHER PUBLICATIONS

IBM Technical Disclosure Bulletin; vol. 36 No. 06B Jun. 1993; Limiting Data Loss on Large Information Blocks Stored with Adaptive Data Compression Techniques.

IBM Technical Disclosure Bulletin; vol. 28 No. 11 Apr. 1986; Recomputing Cyclic Redundancy Code Check Bits.

IBM Technical Disclosure Bulletin; vol. 29 No. 7 Dec. 1986; Error Control for Voice/Data Packet Network.

IBM Technical Disclosure Bulletin; vol. 39 No. 04 Apr. 1996; Real Time Detection and Disablement of Viruses in a Data Communications.

IBM Technical Disclosure Bulletin; vol. 37 No. 09 Sep. 1994; Method of Maintaining Data Integrity in Portable Computer Systems.

* cited by examiner

SYSTEM AND METHOD FOR UPDATING MICROCODE STORED IN A NON-VOLATILE MEMORY

BACKGROUND

1. Field of the Present Invention

The present invention generally relates to error detection mechanisms in electronic systems and more particularly to a method and system that utilize CRC codes for portions of a file to verify file integrity.

2. History of Related Art

The use of CRC codes to verify the integrity of digital information is well known. CRC codes are typically generated at the time a file is generated. When the file is later transferred or copied to a second location, the CRC code is used to verify that copied file is a duplicate of the original file. The prior art uses of CRC codes do not, however, address the problem of verifying the transferred data before committing the transferred data to a destination medium. Typically in the prior art, the CRC codes are verified only after the transferred file is stored in its destination. This drawback is significant, especially in file transfer applications, such as the updating of a system's microcode, in which the accuracy of the transferred file is critical and, in which, the data, once committed, cannot be trivially overwritten by simply initiating another transfer. Moreover, existing CRC applications are not typically optimized to recognize that files are routinely transferred as a sequence of portions or sectors. Sector transfers can be utilized to provide earlier feedback for error detection circuitry and can help pinpoint the source of the errors. Jedwab (U.S. Pat. No. 5,778,013) for example utilizes generated CRC codes on a sector by sector basis coupled with a CRC code compilation technique to facilitate error checking in a transfer mechanism in which multiple messages are interspersed on the transfer medium. The sector CRCs of Jedwab are tagged and later summed using a summing technique to produce a final CRC code for each message. Unfortunately, the Jedwab patent and others that address CRC codes in the context of sectored transfers assume (1) that the transmit side generates the first pass CRC codes and (2) that, if an error is detected, the file can simply be retransmitted or resent. In addition, the prior art does not typically consider the application of CRC codes for use in embedded applications where system resources are exceedingly scarce. Without sufficient memory, for example, to store each sector of a file until the entire file's CRC code is known, the system must essentially decide whether to keep the sector data without the luxury of being able to wait until the file is completely transferred to verify the CRC code. With the proliferation of the use of error prone file transfer media, it would be highly desirable to implement a practical and elegant solution to these problems.

SUMMARY OF THE INVENTION

Broadly speaking, the invention contemplates a method of verifying the integrity of a file transferred as a plurality of sectors. During a first pass transfer of a sectored file, first pass sector CRC codes are generated for each sector. These first pass sector CRC codes are stored in a system memory. In the preferred embodiment, the sector data is not committed to the destination medium. During a second pass transfer, second pass CRC codes are generated for each sector. The second pass CRC codes are compared to the first pass CRC codes for corresponding sectors. If the second pass CRC code matches the first pass CRC code, the sector is committed to the destination medium. In the preferred embodiment, the second pass transfer is retried if the first and second pass CRC codes do not match. The CRC sector values for an initial sector of the file are preferably generated from a predefined seed. Each successive CRC sector value is then preferably generated from the preceding sector's CRC code such that the sector CRC code of the last sector comprises a final CRC code of the file. In the preferred embodiment, the second pass transfer is aborted if the first pass final CRC code varies from an embedded CRC code in the file. In one embodiment, the file comprises microcode and sectors are stored by programming a flash memory or other suitable non-volatile storage device.

In another embodiment, the invention contemplates the updating or reprogramming of a system's microcode in which, prior to the transfer process, a final CRC code is embedded in a header of a microcode file on a source medium. In a first pass transfer, the microcode file is transferred to the system with a plurality of sector transfers. First pass sector CRC codes are generated for each segment transferred during the first pass transfer and stored in memory. In one embodiment, the first pass sector CRC code of the last sector of the microcode is the first pass final CRC code for the microcode. The first pass final CRC code is then compared to the embedded CRC code in the file header. Responsive to a match between the embedded final CRC code and the first pass final CRC code, the microcode file is then transferred again to the system in a second transfer to the system with a plurality of sector transfers. Second pass sector CRC codes are generated for each sector transferred during the second pass transfer and compared to each second pass sector CRC code with the sector's corresponding first pass sector CRC code. Responsive to detecting a match between a first pass sector CRC code and a second pass sector CRC code, the sector is stored in a non-volatile storage of the system. The source medium may comprise a diskette, the hard disk of a server to which the system connected via a network, or other suitable media The invention further contemplates a system including means for receiving file sectors, means for generating first pass sector CRC codes for each file sector received during a first pass file transfer, means for storing each first pass sector CRC code in memory, means for extracting a final CRC code embedded in the file, means for comparing the first pass sector CRC code of the final sector to the embedded final CRC code, means, responsive to the comparing means, for initiating a second pass transfer of the file sectors, means for generating second pass sector CRC codes for each sector received during the second pass transfer and for comparing the second pass sector CRC codes to respective first pass sector CRC codes; and means for storing sectors if their second pass sector CRC code matches their first pass CRC code for the sector.

BRIEF DESCRIPTION OF THE DRAWINGS

Other objects and advantages of the invention will become apparent upon reading the following detailed description and upon reference to the accompanying drawings in which.

Figure 1:
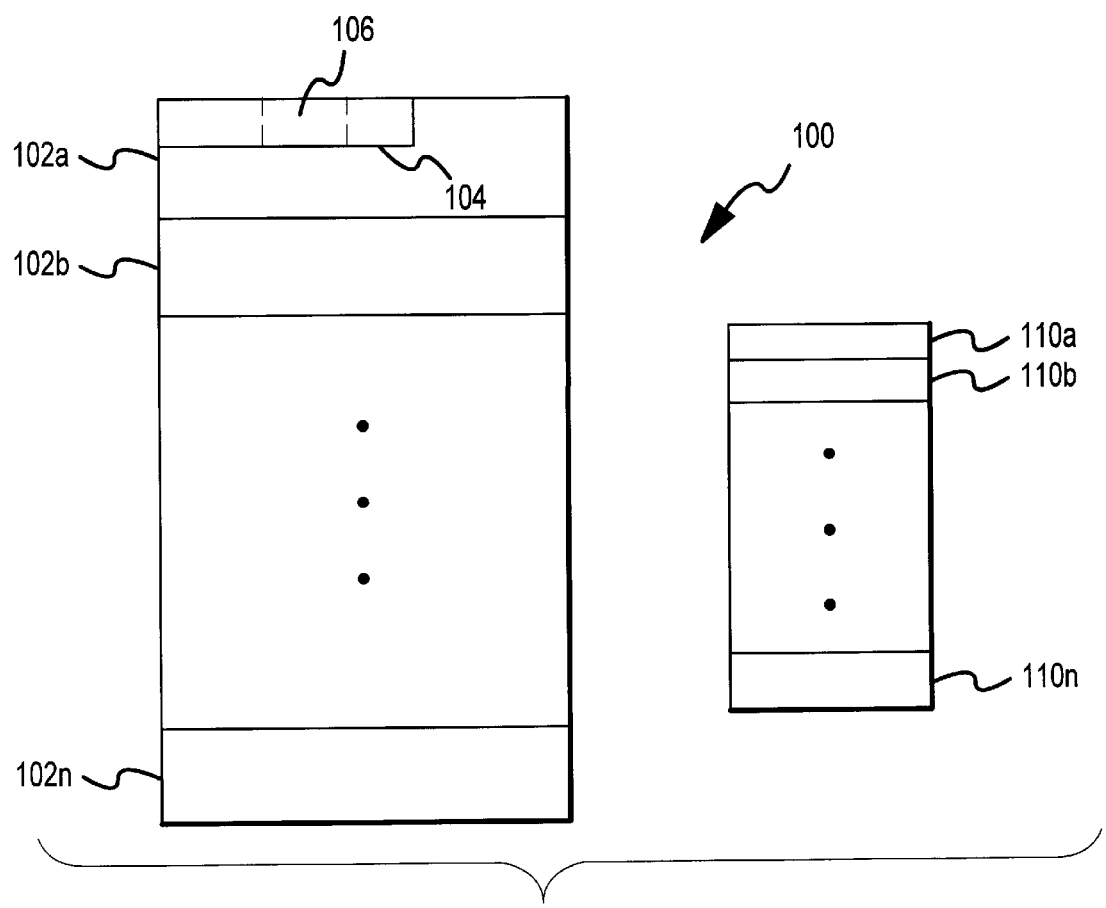
Fig. 1 is a representation of a file to be transferred and an array of sector CRC values associated with the file according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a representation of a source file 100 for use with the present invention and its corresponding partial or sector CRC codes 110 (described in greater detail below). Source file 100 represents any file requiring transferring or copying from a source location to a target destination. Source file 100 may exists on any of a wide variety of storage media including, diskette, CD ROM, hard disk, or system memory. The contents of source file 100 may comprise essentially any combination of code or data. For use with the preferred embodiment of the invention, the media in which source file 100 is embodied is organized into blocks or portions referred to in this disclosure as sectors. Although the term sector is a term of art that may have an understood meaning in some contexts, the use of the word in this disclosure is intended broadly to include any portion or segment in which the storage media is organized. The portions of file 100 that are stored in each sector are indicated in the drawing as file sectors 102a. 102n (collectively or generically referred to as file sectors 102 or file sector 102). In many applications in which a file such as file 100 is comprised of a number of sectors 102, transferring or copying file 100 to another medium is accomplished with a series of sector transfers in which a single sector 102 is read from the source and delivered to the destination. Because the transfer mechanism by which sectors 102 are transferred and the storage medium on which the source file 102 resides may introduce or contain errors, the transfer process is typically required to include some manner of error checking procedure or method in which a code or value is generated based upon the contents of source file 100 prior to transfer. The error code is regenerated at the target destination based on the copy of file 100 that arrives at the target destination. If the error code generated at the target destination varies from the error code generated prior to transfer, an error has been introduced into the system. As discussed above, the CRC algorithm is commonly invoked to generate error codes. When this is the case, a CRC generated error code (CRC code) is generated for source file 100 and embedded within source file 100 prior to transfer. In one embodiment, the initial sector 102a of source file 100 includes a header field 104 in which the CRC code 106 resides. For purposes of this disclosure, this embedded CRC code is referred to as a final CRC code to indicate that it is the CRC code generated from the contents of the entire file.

The ability to verify the integrity of a transferred or copied file is obviously important in a wide variety of applications. An example of an application in which verification of a transferred file is particularly important is the process by which computer microcode is updated. Microcode as used herein refers to computer code that may perform one of more fundamental tasks such as booting the system and controlling basic system hardware such as the disk drives of a system. In embedded systems, which may or may not include a user interface, the microcode controls all aspects of the system behavior. Microcode is typically stored on a nonvolatile memory device of the system. The microcode may be loaded into the system's main memory when the system is initialized. Without a resident, functional copy of its microcode, a system is essentially non-functional. Moreover, the microcode typically contains a small program for reprogramming the non-volatile storage device. It will be appreciated that this arrangement can result in a catch 22 scenario in which a bad copy of microcode prevents the system from reprogramming its microcode. When this occurs, a costly and time consuming field service is typically required to reprogram the non-volatile device.

Figure 2:
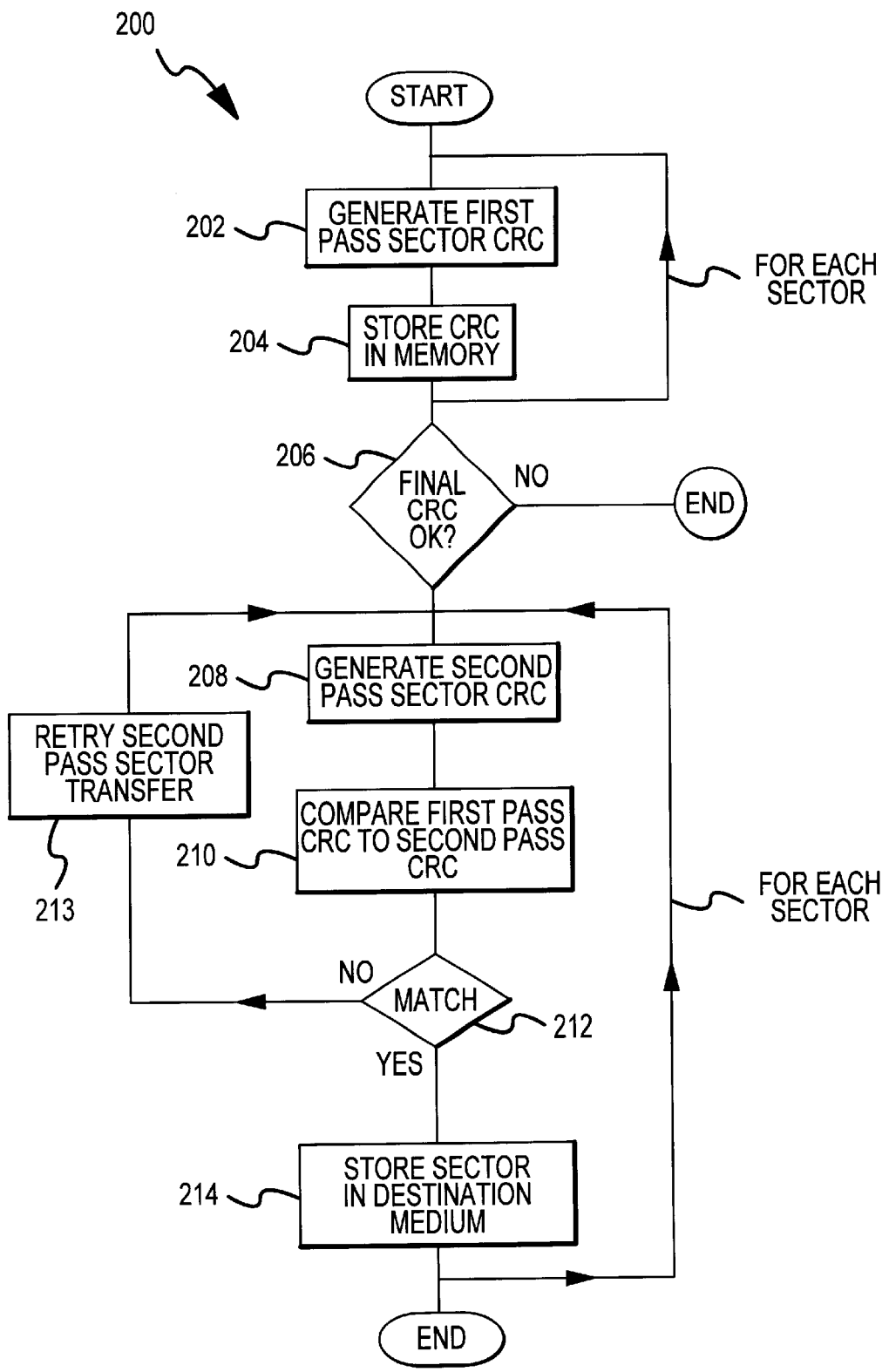
Fig. 2 is a flow diagram of a file transfer method according to the present invention.

Turning now to FIG. 2, a flow diagram representing one embodiment of a process or method 200 of transferring and verifying data is depicted. Method 200 contemplates a two pass transfer process suitable for use with segmented or sectored files. Method 200 is particularly suited for applications in which system resources are scarce. Embedded systems, as an example, are characterized by system resources, such as RAM space, just sufficient to enable the control of a device or piece of hardware. The limited resources of such systems create a dilemma when attempting to update or reprogram the system's microcode. Because there is typically insufficient resources to saving an entire copy of the microcode locally prior to actually storing the microcode in the non-volatile device, it is necessary to program the microcode "on the fly." If, for example, the microcode is transferred in sectors, each sector might be programmed into the non-volatile device as it is received. On the fly updating of microcode contains the potential for disaster because the integrity of the transferred file is not known until the entire file has been transferred. If it is discovered that a file that has just been programmed into the system's nonvolatile storage is defective, it is typically too late to rectify the situation because the system no longer has a valid copy of its microcode. This potential for disaster is of particular concern when the file transfer process itself is susceptible to error corruption such as when the file is transferred from an error prone medium (e.g., a diskette) or the file is transferred over an error prone transmission medium (e.g., the internet). The invention contemplates a method of addressing the limitations typically confronted when transferring a critical file to a resource limited device or system by utilizing a first pass transfer to assure that the source file contains no errors and a second pass transfer to actually store, write, or program the transferred file into its destination medium.

Returning to FIG. 2, method 200 includes a step 202 in which sector CRC codes are generated during a first pass transfer of the file from the source to the destination. More specifically, a predefined CRC seed code is established and an initial sector, such as sector 102a of file 100, is transferred to the destination system. The destination system includes facilities for receiving the file sectors from the source. These facilities may include a network port, a disk drive, or any other suitable means for receiving data. The destination further includes means or facilities for generating a sector CRC code for each sector received. The means for generating sector CRC codes are of the type well known in the field and may include, for example, a dedicated 16-bit or 32-bit shift register arranged to receive the incoming sector data. The CRC shift register is preset with the predefined seed value prior to receiving initial sector 102a. The state of the shift register at the conclusion of each sector transfer is defined as the first pass sector CRC code 110 for the corresponding sector. The first pass sector CRC code 110k for a sector 102k serves as the CRC seed code for the immediately following sector 102(k+1). In one embodiment, each sector 102 consists of 512 bytes of data. In process step 204 each of the first pass sector CRC codes is stored in resident memory of the system. In the preferred embodiment of the invention, the sector data itself may be discarded during the first pass after the first pass sector CRC codes 110 (also referred to as partial CRC codes) are stored. Process steps 202 and 204 are reiterated for each sector 102n of file 100 until all sectors 102 have been transferred and first pass sector CRC codes 110 generated for each sector 102 and stored in system memory. In this manner, the first pass sector CRC code 110n corresponding to last sector 102n of file 100 is also the full or final CRC code for the entire file 100.

At the end of the first pass transfer, the first pass sector value 110n of the final sector 102n, referred to herein as the first pass final CRC code, is compared to a final CRC code 106 that was embedded within file 100 prior to the first pass transfer and presumably at the time when file 100 was generated. A decision is then made in process step 206 based upon the result of the comparison between first pass final CRC code 110n and the embedded CRC code 106. If first pass final CRC code 110n matches embedded CRC code 106, the method 200 continues and a second pass transfer is initiated and executed as described below. If, on the other hand, first pass final CRC code 110n does not match embedded CRC code 106, the transfer is aborted. Notice that aborting the transfer process at this stage leaves the destination medium with the original, presumably functional, copy of file under consideration intact. In embodiments of the invention where file 100 represents the system's microcode, this feature of the invention prevents alteration of the original file before the integrity of the source file 100 is determined.

Assuming that the first pass final CRC code 110n matches the embedded CRC code 106, a second pass transfer is initiated. In process step 208, sectors 102 are transferred to the system and second pass sector CRC codes are generated in process step 208 in the same manner as the first pass transfers referred to above. In process step 210, each second pass sector CRC code is compared to the corresponding first pass sector CRC code 110 stored in memory. Before a sector's data is actually committed to the destination medium, the second pass sector CRC code is compared to the corresponding first pass sector CRC code in process step 212. If a match between the corresponding sector CRC codes is not found, the sector data is discarded. In the preferred embodiment, the sector under consideration is resent from the source in process step 213 and a new second pass sector CRC code generated. Only if the second pass sector CRC code matches the first pass sector CRC code is the sector data committed to the destination medium in process step 214. In this manner, the method 200 of the present invention reduces the likelihood of committing a faulty sector to the destination medium by using a first pass to do two things: (1) assure that the source file itself is valid (without committing the file to its destination) and (2) create sector CRC codes for each sector and using a second pass transfer to assure that no errors are introduced into a sector by the transfer mechanism.

Figure 3:
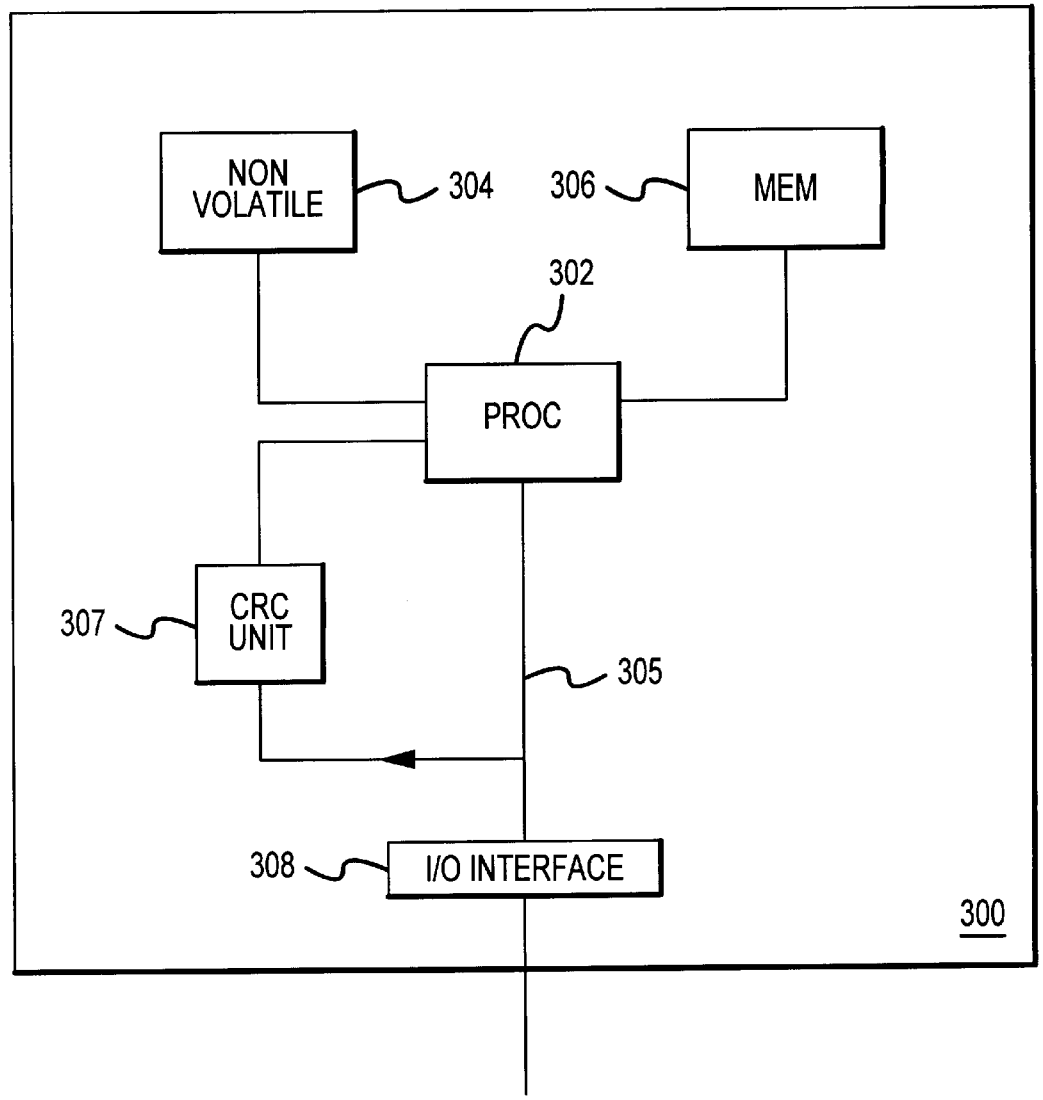
Fig. 3 is a simplified block diagram of a system for transferring files according to the present invention.

Turning now to FIG. 3, a simplified block diagram of one embodiment of a system 300 according to the present invention is presented. System 300 includes an I/O interface 308 suitable for receiving data. The data may originate from a device within system 300 such as a disk drive (not depicted) via an I/O bus such as a PCI bus or an ISA bus. Alternatively, the data may originate from externally such as via a network connection. I/0 unit 308 is coupled to a processor 302 via an I/O bus 305. In the preferred embodiment, system 300 further includes a CRC unit 307 that is coupled between processor 302 and I/O interface 308. CRC unit 307 contains a dedicated circuit including a suitable shift register arranged in accordance with well known practice for CRC shift register circuits. The shift register is preferably of the 16-bit or 32-bit variety to provide a substantial level of confidence in the generated CRC values. Processor 302 is connected to and adapted for executing processor instructions stored on a non-volatile device 304. Processor 302 has access to a system memory 306, which processor 302 can use for storing first pass sector CRC codes 110 generated by CRC unit 307 during a first pass transfer of a file 100. System 300 further includes a non-volatile device 304 connected to processor 302. Non-volatile device 304 contains the microcode that enables processor 302 and system 300 to execute an application or control a device. In one embodiment, non-volatile device 314 is implemented as a flash memory device well known in the field of integrated circuit memory devices. Other embodiments of the invention may utilize traditional EEPROM devices or the like. In one embodiment, non-volatile device contains a program that, enables processor 302 to execute the file transfer and verification procedure described above. More specifically, nonvolatile device 304 includes a program that utilizes the hardware of system 300 to generate first pass sector CRC codes for each file sector received via I/O interface 308 and for storing the first pass sector CRC codes in memory 306. After the first pass transfer is complete, the file transfer program of non-volatile device extracts an embedded CRC code from the file and compares it to the first pass final sector CRC value. The programs then initiates the second pass transfer if the comparison between the first pass final sector CRC code equals the embedded CRC code. During the second pass transfer, processor 302 and CRC unit 307, under the control of the file transfer program in non-volatile device 304, generate second pass sector CRC values for each sector received and compare the second pass sector CRC code to the corresponding first pass sector CRC code stored in memory 306. If the codes match, then the sector data is stored or programmed into non-volatile device 304. If the codes fail to match during the second pass transfer, the sector is resent in the preferred embodiment to see if a soft error that might have occurred during the second pass transmission is gone.

It will be apparent to those skilled in the art having the benefit of this disclosure that the present invention contemplates a method of transferring sectored files with greater confidence of the integrity of the transferred file. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of transferring, from a source medium, a microcode file comprising a plurality of sectors and including a final CRC code derived from the contents of the entire file to a flash memory of a data processing system, comprising:

transferring, in a set of first pass transfers, the sectors of the microcode file to the system;

generating first pass sector CRC codes for each sector transferred during the set of first pass transfers and storing the first pass sector CRC codes in volatile system memory, wherein each first pass sector CRC code is based at least in part upon the contents of the corresponding sector;

comparing the first pass sector CRC code of the last sector transferred during the set of first pass transfers to the final CRC code of the microcode file;

responsive to a match between the final CRC code and the first pass sector CRC code of the last sector transferred, transferring the sectors of the microcode file to the system as a set of second pass transfers;

generating second pass sector CRC codes for each sector transferred during the set of second pass transfers and comparing each second pass sector CRC code with the sector's corresponding first pass sector CRC code; and responsive to detecting a match between a first pass sector CRC code and a second pass sector CRC code, storing the corresponding sector in a non-volatile storage of the system.

2. The method of claim 1, further comprising, responsive to detecting a variation between a sector's first pass sector CRC code and its second pass sector CRC code, re-sending the sector, re-generating a sector CRC code and retrying the comparison to the sector's first pass sector CRC code.

3. The method of claim 1, wherein the size of the file is large relative to the size of the volatile system memory.

4. The method of claim 1, wherein the source medium comprises a medium selected from a diskette and a hard disk of a server to which the system connected via a network.

5. The method of claim 1, further comprising, prior to performing the second pass transfers, discarding any sectors transferred during the first past transfer from system memory.

6. The method of claim 1, wherein a transfer mechanism for the transferring comprises a mechanism selected from a network communication mechanism and a disk drive mechanism.

7. The method of claim 1, wherein each sector comprises 512 bytes.

8. A system comprising:

means for receiving file sectors;

means for generating first pass sector CRC codes for each file sector received during a first pass file transfer wherein each first pass sector CRC code is based at least in part upon the contents of the corresponding sector;

means for storing each first pass sector CRC code in volatile system memory;

means for Extracting a final CRC code embedded in the file wherein the final CRC code is based upon the contents of the entire file;

means for comparing the first pass sector CRC code of the final sector to the final CRC code;

means, responsive to the comparing means, for initiating a second pass transfer of the file sectors;

means for generating second pass sector CRC codes for each sector received during the second pass transfer and for comparing the second pass sector CRC codes to respective first pass sector CRC codes; and means for storing sectors in flash memory if their second pass sector CRC code matches their first pass CRC code for the sector.

9. The system of claim 8, further comprising means for re-sending a sector if its second pass sector CRC code does not match the sector's first pass sector CRC code.

10. The system of claim 8, wherein the file sectors are received sequentially and wherein the first and second pass sector CRC codes for the first sector are generated from a predefined seed.

11. The system of claim 10, wherein the first and second pass sector CRC codes are generated using the CRC codes from immediately preceding sectors as seeds.

12. The system of claim 8, wherein the means for storing the sectors includes a flash memory.

13. A method of verifying the integrity of a microcode file transferred as a plurality of sectors comprising:

generating first pass sector CRC codes for each sector during a first set of sector transfers and storing the first pass sector CRC codes in volatile memory of data processing system;

responsive to the first pass sector CRC code of a last sector transferred during the first set of sector transfers matching a final CRC code that is based upon the contents of the entire microcode file, transferring the sectors of the microcode file to the system as a second set of sector transfers;

generating second pass sector CRC codes for each sector during the second set of sector transfers; and responsive to the second pass sector CRC code for a sector matching the first pass sector CRC code for the sector, storing the sector in a destination medium.

14. The method of claim 13, wherein the first and second pass CRC sector values for an initial sector of the file are generated from a predefined seed.

15. The method of claim 14, wherein each successive CRC sector value is generated from the preceding sector's CRC code and further wherein the sector CRC code of the last sector comprises a final CRC code of the file.

16. The method of claim 15, wherein the second transfer is aborted if the first pass final CRC code varies from an embedded CRC code in the file.

17. The method of claim 13, further comprising, prior to generating the first pass sector CRC codes, calculating a final CRC code for the file and embedding the final CRC code within the file.

18. The method of claim 13, wherein the step of storing the sector comprises programming the sector into a flash memory device.

19. The method of claim 13, wherein each sector comprises 512 bytes.

* * * * *